(12) United States Patent
Cimatti et al.

(10) Patent No.: US 7,578,762 B2
(45) Date of Patent: Aug. 25, 2009

(54) FOUR-WHEEL DRIVE VEHICLE TRANSMISSION

(75) Inventors: Franco Cimatti, Pavullo (IT); Carlo Neri, Modena (IT)

(73) Assignee: Ferrari S.p.A. (IT)

( * ) Notice: Subject to any disclaimer, the term of this patent is extended or adjusted under 35 U.S.C. 154(b) by 28 days.

(21) Appl. No.: 10/492,873

(22) PCT Filed: Oct. 15, 2002

(86) PCT No.: PCT/IT02/00658

§ 371 (c)(1),
(2), (4) Date: Jan. 14, 2005

(87) PCT Pub. No.: WO03/033939

PCT Pub. Date: Apr. 24, 2003

(65) Prior Publication Data

US 2005/0119088 A1    Jun. 2, 2005

(30) Foreign Application Priority Data

Oct. 16, 2001    (IT) .......................... TO2001A0978

(51) Int. Cl.
*F16H 37/08* (2006.01)

(52) U.S. Cl. ..................... 475/206; 475/207; 180/248

(58) Field of Classification Search ................. 475/202, 475/206, 207, 209, 218; 74/329; 180/248
See application file for complete search history.

(56) References Cited

U.S. PATENT DOCUMENTS

| | | | |
|---|---|---|---|
| 4,208,923 A | * | 6/1980 | Ikegami ..................... 74/15.63 |
| 4,744,437 A | * | 5/1988 | Matsumoto ................. 180/249 |
| 6,780,135 B2 | * | 8/2004 | Shibuya ..................... 475/206 |

* cited by examiner

*Primary Examiner*—Saul Rodriguez
*Assistant Examiner*—Derek D. Knight
(74) *Attorney, Agent, or Firm*—John A. Artz; Dickinson Wright PLLC

(57) ABSTRACT

A four-wheel-drive vehicle transmission (1) having a drive torque input shaft (8) rotated about a first axis of rotation (A); a front output shaft (10); a rear output shaft (12); an auxiliary tubular shaft (14) mounted alongside the input shaft (8) to rotate about a second axis of rotation (D); at least one first group of gears (15, 16) for selectively connecting the auxiliary tubular shaft (14) to the input shaft (8); a first countershaft (17) mounted inside the auxiliary tubular shaft (14); a second countershaft (18) mounted for rotation opposite the first countershaft (17); a planetary gear train (19) for mechanically connecting the auxiliary tubular shaft (14) to the first (17) and second (18) countershafts; and a first (25) and a second (26) cascade gear set for connecting the first and second countershafts (17,18) to the front and rear output shafts (10,12), respectively.

15 Claims, 5 Drawing Sheets

FOUR-WHEEL DRIVE VEHICLE TRANSMISSION

TECHNICAL FIELD

The present invention relates to a vehicle transmission.

More specifically, the present invention relates to a transmission for high-performance, four-wheel-drive cars, to which the following description refers purely by way of example.

BACKGROUND OF THE INVENTION

As is known, in some conditions, high-performance cars have great difficulty discharging the power from the engine to the road. In recent years, therefore, a number of major car manufacturers have begun marketing high-performance car models with four-wheel drives.

Besides effectively solving the problem of discharging the power from the engine to the road, such a solution also provides for greatly improving control, road-holding in poor-grip conditions, and therefore intrinsic safety of the vehicle.

Unfortunately, currently marketed four-wheel-drive transmissions have the major drawback of being extremely heavy and bulky, thus creating serious design problems in terms of location within the vehicle and weight distribution over the two vehicle axles. The structure of currently marketed transmissions, in fact, is derived directly from that normally employed in off-road vehicles, in which the weight and bulk of the transmission are considered secondary to strength and simplifying construction.

SUMMARY OF THE INVENTION

It is an object of the present invention to provide a four-wheel-drive vehicle transmission, which is more compact and lightweight than those currently used, and which is suitable for use in high-performance cars.

According to the present invention, there is provided a four-wheel drive-vehicle transmission comprising a drive torque input shaft rotated by the vehicle engine about a first axis of rotation; a front output shaft connected to the front axle of the vehicle; and a rear output shaft connected to the rear axle of the vehicle; said transmission being characterized by also comprising an auxiliary tubular shaft mounted alongside said input shaft to rotate about a second axis of rotation parallel to said first axis of rotation; a number of groups of gears for selectively connecting the auxiliary tubular shaft mechanically to said input shaft; a first countershaft mounted for rotation about said second axis of rotation inside said auxiliary tubular shaft; a second countershaft mounted for rotation about said second axis of rotation opposite said first countershaft; a planetary gear train for mechanically connecting said auxiliary tubular shaft to the first and second countershaft; and a first and a second cascade gear set for mechanically connecting the second countershaft to the rear output shaft, and the first countershaft to the front output shaft respectively.

BRIEF DESCRIPTION OF THE DRAWINGS

A non-limiting embodiment of the present invention will be described by way of example with reference to the accompanying drawings, in which.

DESCRIPTION OF THE PREFERRED EMBODIMENTS

Figure 1:
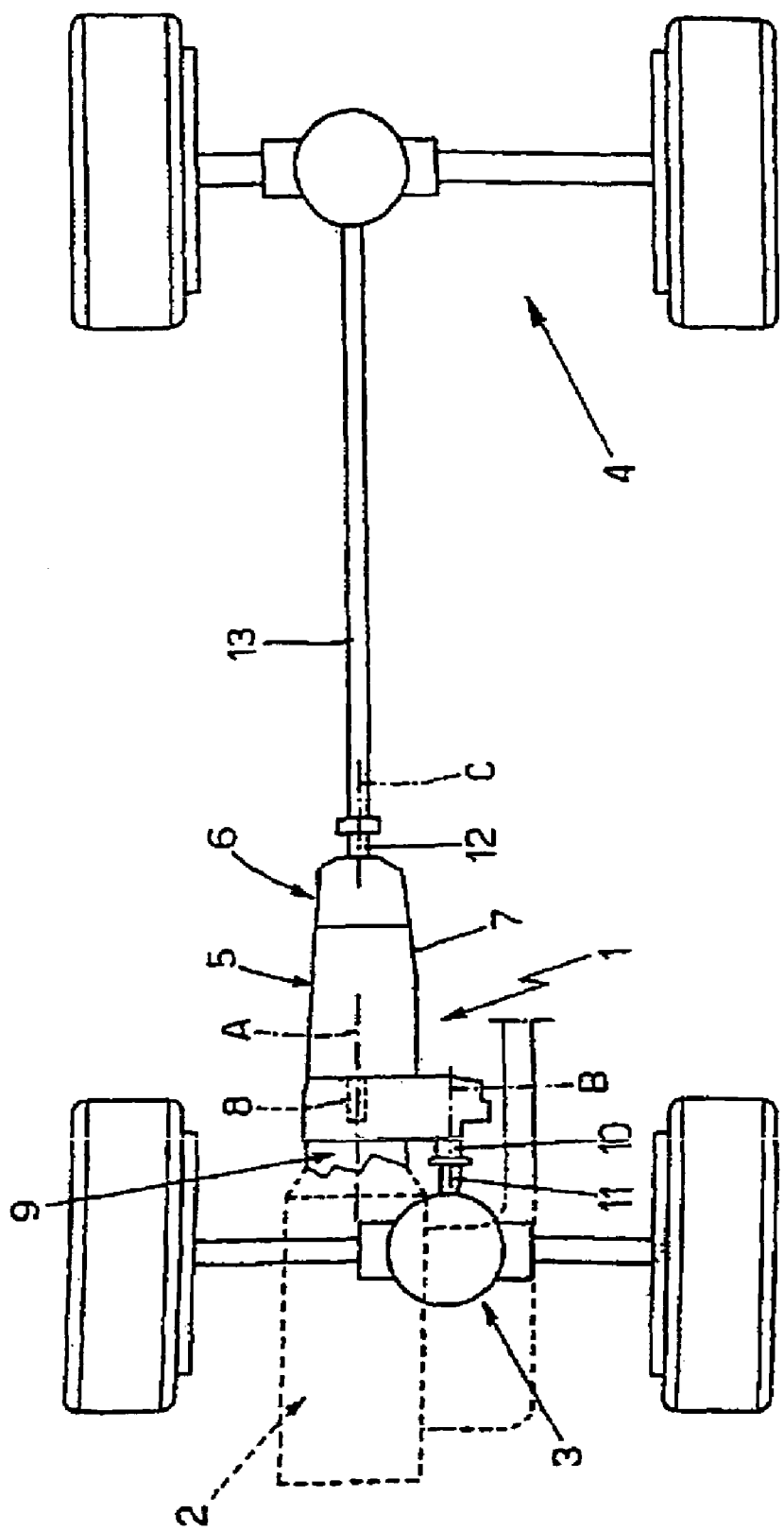
FIG. 1 shows a schematic plan view of a wheel-drive vehicle equipped with a transmission accordance with the teachings of the present invention.

Number 1 in FIG. 1 indicates as a whole a four-wheel-drive vehicle gear transmission, which may be used to particular advantage in high-performance, permanent four-wheel-drive cars with a longitudinal engine.

Cars of the above type comprise an internal combustion engine 2 housed longitudinally inside the vehicle, i.e. parallel to the longitudinal axis of the vehicle; a front axle 3 for transferring the drive torque from engine 2 to the front wheels of the vehicle; and a rear axle 4 for transferring the drive torque from engine 2 to the rear wheels of the vehicle.

Figure 2:
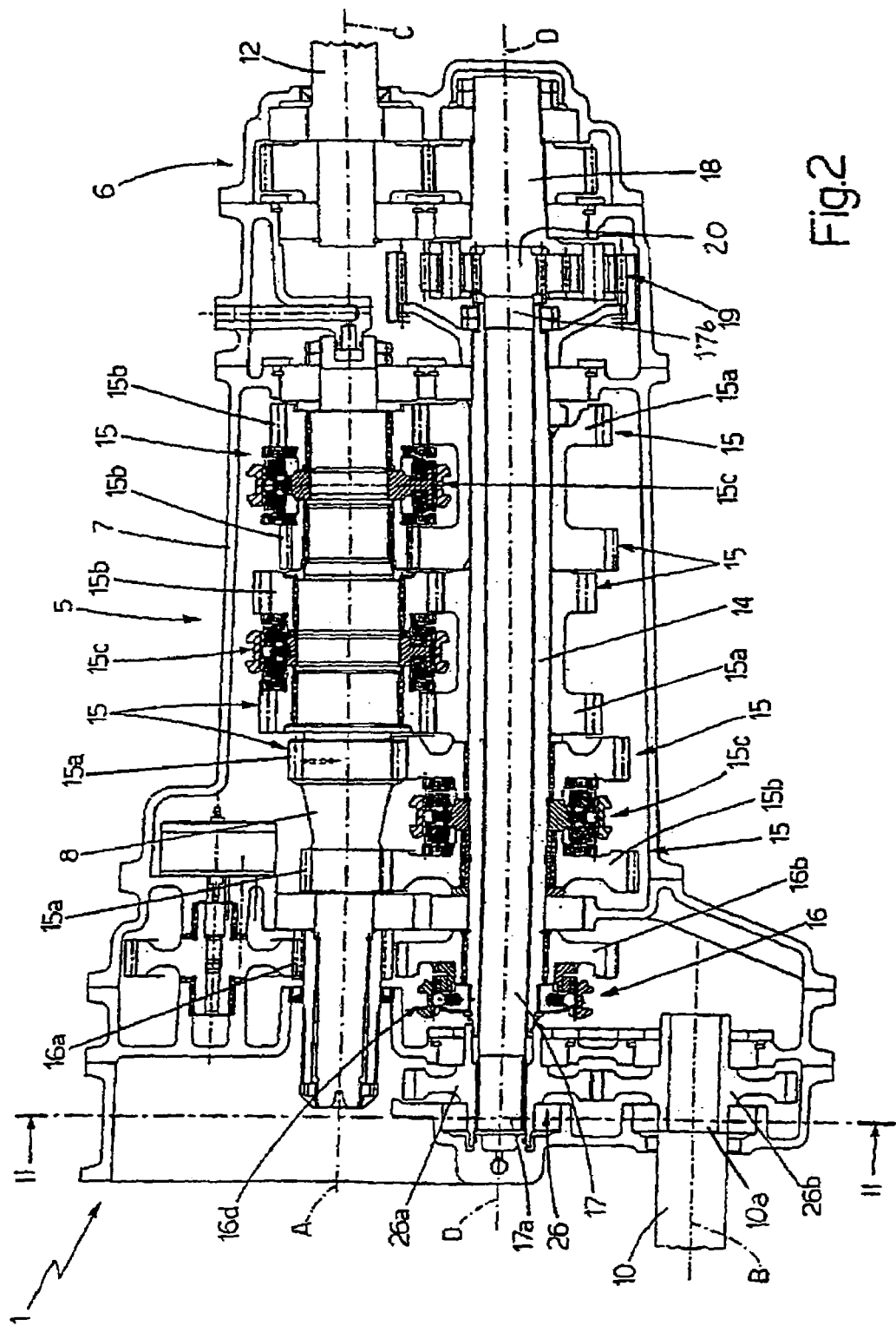
FIG. 2 shows a section, with parts removed for clarity, of the FIG. 1 transmission.

With reference to FIGS. 1 and 2, transmission 1 connects engine 2 mechanically to front axle 3 and rear axle 4 of the vehicle, and comprises a transmission case 5 and a central differential 6 integrated inside one rigid outer shell 7 designed to minimize the overall size of the transmission.

More specifically, transmission 1 comprises a drive torque input shaft 8 connected directly to engine 2 by a known clutch assembly 9; a front output shaft 10 connected to front axle 3 of the vehicle by a first propeller shaft 11; and a rear output shaft 12 connected to rear axle 4 of the vehicle by a second propeller shaft 13.

With reference to FIGS. 1 and 2, input shaft 8 is mounted to rotate about an axis A of rotation preferably, though not necessarily, parallel to the longitudinal axis of the vehicle; and front output shaft 10 and rear output shaft 12 are mounted to rotate about respective axes B and C of rotation parallel to axis A.

In the example shown, input shaft 8 and rear output shaft 12 are aligned opposite each other, so that axes A and C coincide.

With reference to FIG. 2, inside rigid outer shell 7, transmission 1 comprises an auxiliary tubular shaft 14 extending alongside and parallel to input shaft 8; and a number of pairs of gears 15 for selectively connecting auxiliary tubular shaft 14 mechanically to input shaft 8, so that input shaft 8 rotates auxiliary tubular shaft 14 about an axis D of rotation at an angular speed depending on the reduction ratio of each pair of gears 15.

In the example shown, each pair of gears 15 comprises a primary gear 15a fitted permanently to input shaft 8 or auxiliary tubular shaft 14; a secondary gear 15b fitted in freely rotating manner to the other of the two shafts and meshing with primary gear 15a; and a synchronizing unit 15c fitted to input shaft 8 or auxiliary tubular shaft 14, alongside secondary gear 15b, and for selectively making secondary gear 15b angularly integral with the shaft to which it is fitted, so as to transfer the drive torque from one shaft to the other.

More specifically, in the example shown, transmission 1 comprises six forward pairs of gears 15 arranged as follows: four consecutive pairs of gears 15 are fitted to input shaft 8 and auxiliary tubular shaft 14, so that synchronizing units 15c are located on input shaft 8; and the other two pairs of gears 15 are fitted to input shaft 8 and auxiliary tubular shaft 14, so that synchronizing units 15c are located on auxiliary tubular shaft 14.

It should be pointed out that, besides halving the number of synchronizing units 15c required to operate secondary gears 15b—each synchronizing unit 15c is, in fact, located between and provides for connecting two adjacent secondary gears 15b to the shaft—the above arrangement also minimizes the axial length of input shaft 8 and auxiliary tubular shaft 14. The axial width of synchronizing units 15c, in fact, affects the overall axial length of both shafts, which is reduced to the absolute minimum by distributing synchronizing units 15c on both input shaft 8 and auxiliary tubular shaft 14.

Figure 5:
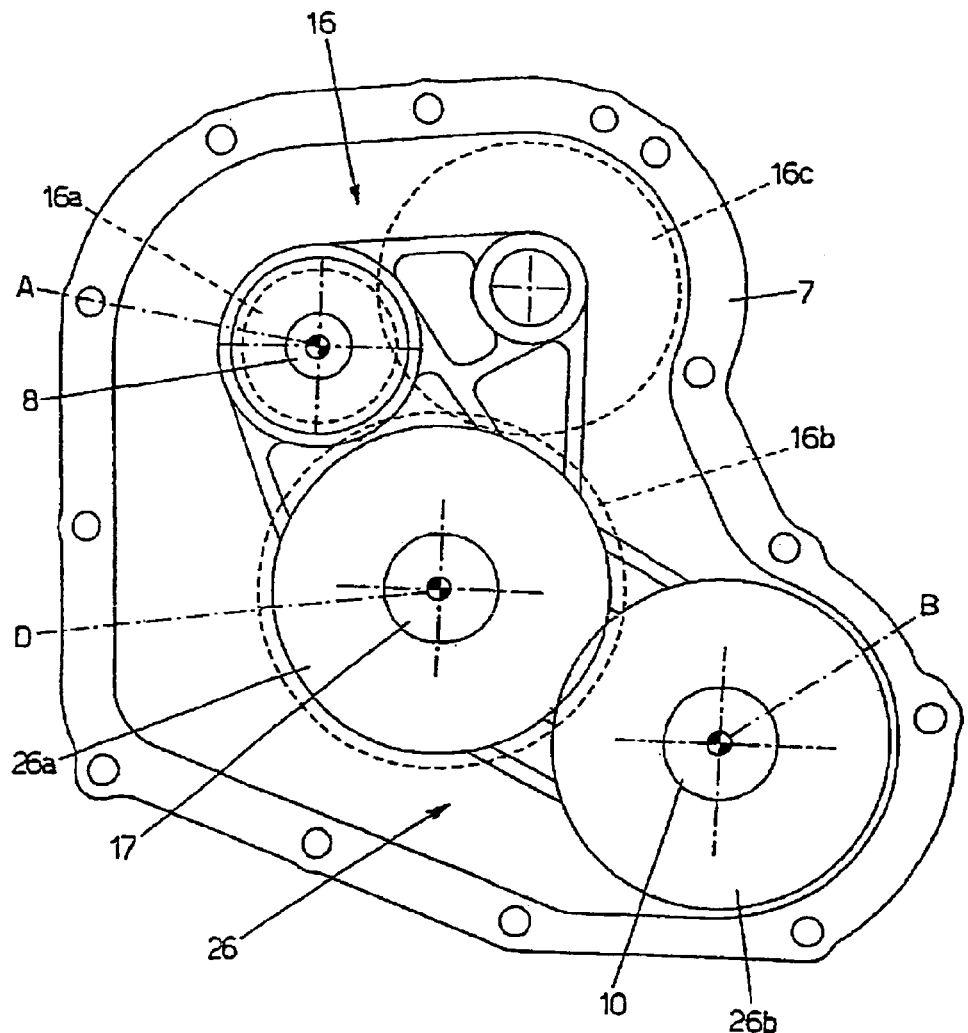
FIG. 5 shows a section, with parts removed for clarity, of the FIG. 2 transmission along line II-II.

With reference to FIGS. 2 and 5, in the example shown, transmission 1 also comprises a cascade gear set 16 for selectively connecting auxiliary tubular shaft 14 mechanically to input shaft 8, so that input shaft 8 rotates auxiliary tubular shaft 14 about axis D in the opposite direction to that produced by connecting auxiliary tubular shaft 14 to input shaft 8 by means of pairs of gears 15, thus inverting the traveling direction of the vehicle (reverse).

More specifically, cascade gear set 16 comprises a primary gear 16a fitted permanently to input shaft 8; a secondary gear 16b fitted in freely rotating manner to auxiliary tubular shaft 14; an intermediate gear 16c mounted for rotation alongside primary gear 16a and secondary gear 16b, so as to mesh simultaneously with both; and a synchronizing unit 16d fitted to auxiliary tubular shaft 14, alongside secondary gear 16b, and for selectively making secondary gear 16b angularly integral with the shaft to which it is fitted, so as to transfer the drive torque from one shaft to the other.

Synchronizing units 15c and 16d are well known automotive mechanical components which require no further description; nor is any description required of the known manner in which the units are operated to engage and disengage gears by forks in transmission case 5.

Figure 3:
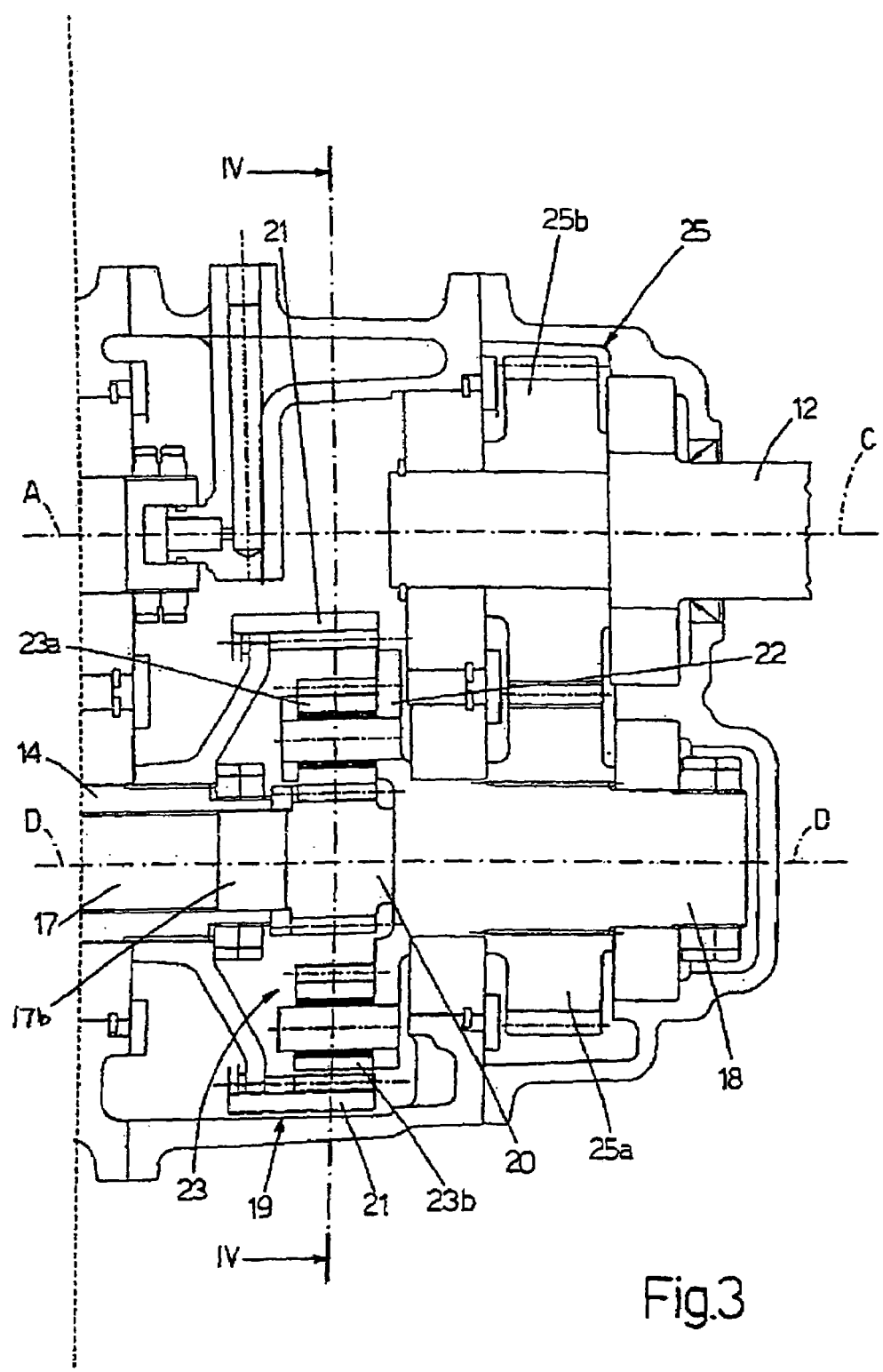
FIG. 3 shows a larger-scale view of a detail in FIG. 2.
Figure 4:
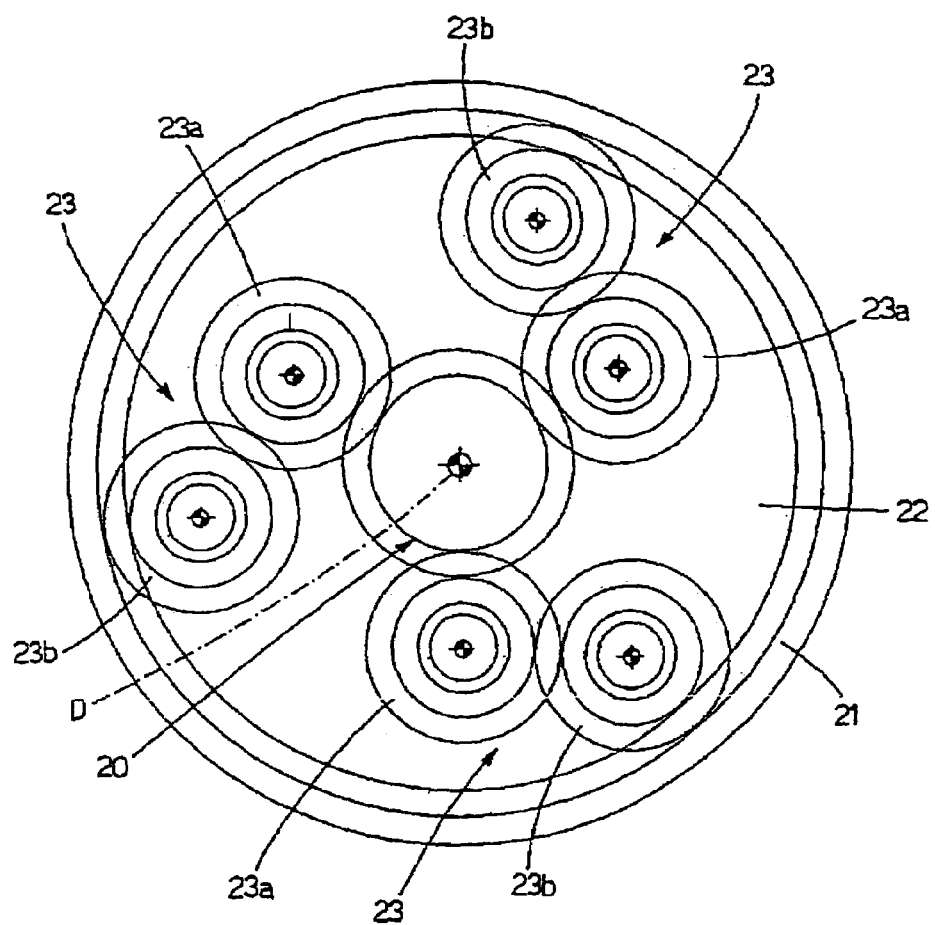
FIG. 4 shows a section, with parts removed for clarity, of the FIGS. 2 and 3 transmission along line IV-IV.

With reference to FIGS. 2, 3 and 4, transmission 1 also comprises a first countershaft 17 mounted for rotation about axis D inside auxiliary tubular shaft 14; a second countershaft 18 mounted for rotation about axis D opposite countershaft 17; and a planetary gear train 19 located between countershafts 17 and 18, and for connecting countershafts 17 and 18 mechanically to auxiliary tubular shaft 14, so that auxiliary tubular shaft 14 rotates countershafts 17 and 18 simultaneously.

More specifically, countershaft 17 is longer than, is mounted for rotation inside, and projects at both axial ends outwards of, auxiliary tubular shaft 14. In the example shown, one axial end of countershaft 17-hereinafter indicated 17a-projects outwards of auxiliary tubular shaft 14, and is located alongside a corresponding axial end 10a of front output shaft 10; and the other end of countershaft 17-hereinafter indicated 17b-is fitted with a pinion 20 defining the sun gear of planetary gear train 19.

The end of auxiliary tubular shaft 14 facing pinion 20 is fitted with a circular flange in turn fitted integrally with a ring gear 21 with inward-facing teeth. Ring gear 21 is positioned facing and coaxial with pinion 20, and defines the outer ring gear of planetary gear train 19.

Countershaft 18 is located alongside one end of rear output shaft 12, and its axial end directly facing pinion 20 is fitted with a circular flange 22 on which are mounted for rotation three pairs of gears 23.

With reference to FIGS. 3 and 4, each pair of gears 23 comprises an inner gear 23a meshing with pinion 20; and an outer gear 23b meshing simultaneously with inner gear 23a and ring gear 21. Inner gears 23a and outer gears 23b are mounted to rotate freely on spindles extending from circular flange 22, parallel to axis D, and define the planet gears of planetary gear train 19, the planet carrier of which is obviously defined by circular flange 22.

With reference to FIGS. 2, 3 and 5, transmission 1 also comprises a first cascade gear set 25 for connecting countershaft 18 mechanically to rear output shaft 12; and a second cascade gear set 26 for connecting countershaft 17 mechanically to front output shaft 10. In the example shown, cascade gear set 25 comprises two mutually meshing gears 25a and 25b fitted to countershaft 18 and to rear output shaft 12 respectively; and cascade gear set 26 comprises two mutually meshing gears 26a and 26b fitted to axial end 17a of countershaft 17 and to front output shaft 10 respectively.

Operation of gear transmission 1 as described and illustrated herein is self-explanatory.

The advantages of gear transmission 1 are obvious: the high degree of component integration provides for obtaining a structure which is extremely compact and lightweight, but at the same time capable of transferring exceptionally high drive torques from engine 2 to front and rear axles 3 and 4.

Input shaft 8 and rear output shaft 12 being coaxial, transmission 1 can be located inside the vehicle closer to the road surface, thus lowering the center of gravity of the car, with obvious advantages in terms of stability and control.

Clearly, changes may be made to transmission 1 as described and illustrated herein without, however, departing from the scope of the present invention.

What is claimed is:

1. A four-wheel-drive vehicle transmission (1) comprising:
   an input shaft (8) rotated by a vehicle engine (2) about a first axis of rotation (A);
   a front output shaft (10) connected to a front axle (3);
   a rear output shaft (12) connected to a rear axle (4);
   said input shaft (8) and said rear output shaft (12) being coaxial;
   an auxiliary tubular shaft (14) mounted alongside said input shaft (8) to rotate about a second axis of rotation (D) parallel to said first axis of rotation (A);
   at least one first group of gears (15, 16) for selectively connecting said auxiliary tubular shaft (14) mechanically to said input shaft (8);
   a first countershaft (17) mounted for rotation about said second axis of rotation (D) inside said auxiliary tubular shaft (14);
   a second countershaft (18) mounted for rotation about said second axis of rotation (D) opposite said first countershaft (17);
   a planetary gear train (19) for mechanically connecting said auxiliary tubular shaft (14) to said first countershaft (17) and said second countershaft (18); and
   a first (25) and a second (26) cascade gear set for mechanically connecting said second countershaft (18) to said rear output shaft (12), and mechanically connecting said first countershaft (17) to said front output shaft respectively (10);
   said front output shaft (10) and said rear output shaft (12) are mounted for rotation respectively about a third axis of rotation (B) and a fourth axis of rotation (C), said third axis of rotation (B) and said fourth axis of rotation (C) parallel to said first axis of rotation (A): and said planetary gear train (19) positioned between said first countershaft (17) and said second countershaft (18), said planetary gear train (19) comprising:
   a pinion (20) fitted to the end of said first countershaft (17);
   a ring gear (21) carried by said auxiliary tubular shaft (14) so as to be coaxial with said pinion (10); and
   a plurality of planet gears (23) mounted for rotation on a planet carrier flange (22) fitted to said second countershaft (18), said plurality of planet gears (23) meshing with said pinion (20).

2. A four-wheel-drive vehicle transmission as claimed in claim 1 wherein said plurality of planet gears (23) comprises:
   at least one pair of planet gears (23), each said pair of planet gears (23) comprising:
   an inner gear (23a) meshing with said pinion (20); and
   an outer gear (23b) meshing simultaneously with the inner gear (23a) and said ring gear (21).

3. A four-wheel-drive vehicle transmission as claimed in claim 1, wherein said at least one first groups of gears (15, 16) comprises:
   at least one of pair of first gears (15) for selectively connecting said auxiliary tubular shaft (14) mechanically to said input shaft (8), each of said at least one pair of first gears (15) comprising:
   a primary gear (15a) fitted permanently to said input shaft (8) or to said auxiliary tubular shaft (14); a secondary gear (15b) fitted in freely rotating manner to the other of said input shaft (8) or to said auxiliary tubular shaft (14), said secondary gear (15b) meshing with said primary gear (15a), and
   a synchronizing unit (15c) fitted to one of said input shaft (8) or said auxiliary tubular shaft (14), said synchronizing unit (15c) positioned alongside said secondary gear (15b), said synchronizing unit (15c) selectively making said secondary gear (15b) angularly integral with said shaft to which it is fitted, so as to transfer drive torque between said input shaft (8) and said auxiliary tubular shaft (14).

4. A four-wheel-drive vehicle transmission as claimed in claim 3, wherein said synchronizing units (15c) corresponds to said at least one pair of first gears (15), said synchronizing units (15c) located partly on said input shaft (8) and partly on said auxiliary tubular shaft (14).

5. A four-wheel-drive vehicle transmission as claimed in claim 1, wherein said first cascade gear set (25) comprises:
   two first cascade gears (25a, 25b) meshing with each other and fitted to said second countershaft (18) and said rear output shaft (12) respectively.

6. A four-wheel-drive vehicle transmission as claimed in claim 1, wherein said second cascade gear set (26) comprises:
   two second cascade gears (26a, 26b) meshing with each other and fitted to said first countershaft (17) and said front output shaft (10) respectively.

7. A four-wheel-drive vehicle transmission (1) comprising:
   an input shaft (8) rotatable about a first axis of rotation (A);
   a front output shaft (10) connected to the front axle (3);
   a rear output shaft (12) connected to the rear axle (4);
   an auxiliary shaft (14) mounted alongside said input shaft (8);
   at least one first group of gears (15, 16) for selectively connecting said auxiliary shaft (14) mechanically to said input shaft (8);
   a first countershaft (17) mounted for rotation about a second axis of rotation (D);
   a second countershaft (18) mounted for rotation about said second axis of rotation (D) opposite said first countershaft (17);
   a planetary gear train (19) for mechanically connecting said auxiliary shaft (14) to said first countershaft (17) and said second countershaft (18); and a first cascade gear set (25) and a second cascade gear set (26) mechanically connecting said second countershaft (18) to said rear output shaft (12), and mechanically connecting said first countershaft (17) to said front output shaft respectively (10);
   said planetary gear train (19) being located between said first countershaft (17) and said second countershaft (18) said planetary gear train (19) comprising:
   a pinion (20) fitted to the end of said first countershaft (17);
   a ring gear (21) carried by said auxiliary shaft (14) so as to be coaxial with said pinion (10); and
   a plurality of planet gears (23) mounted for rotation on a planet carrier flange (22) fitted to said second countershaft (18), said plurality of planet gears (23) meshing with said pinion (20).

8. A four-wheel-drive vehicle transmission as claimed in claim 7, wherein:
   said auxiliary shaft (14) comprises a tubular shaft; and
   said first countershaft (17) is mounted inside said auxiliary tubular shaft (14).

9. A four-wheel-drive vehicle transmission as claimed in claim 7, wherein said front output shaft (10) and said rear output shaft (12) are mounted for rotation respectively about a third axis of rotation (B) and a fourth axis of rotation (C), said third axis of rotation (B) and said fourth axis of rotation (C) parallel to said first axis of rotation (A).

10. A four-wheel-drive vehicle transmission as claimed in claim 7, wherein said at least one first groups of gears (15, 16) comprises:
    at least one of pair of first gears (15) for selectively connecting said auxiliary shaft (14) mechanically to said input shaft (8), each of said at least one pair of first gears (15) comprising:
    a primary gear (15a) fitted permanently to said input shaft (8) or to said auxiliary shaft (14);
    a secondary gear (15b) fitted in freely rotating manner to the other of said input shaft (8) or to said auxiliary shaft (14), said secondary gear (15b) meshing with said primary gear (15a), and
    a synchronizing unit (15c) fitted to one of said input shaft (8) or said auxiliary shaft (14), said synchronizing unit (15c) positioned alongside said secondary gear (15b), said synchronizing unit (15c) selectively making said secondary gear (15b) angularly integral with said shaft to which it is fitted, so as to transfer drive torque between said input shaft (8) and said auxiliary shaft (14).

11. A four-wheel-drive vehicle transmission (1) comprising:
    an input shaft (8) rotated by a vehicle engine (2) about a first axis of rotation (A);
    a front output shaft (10) connected to a front axle (3);
    a rear output shaft (12) connected to a rear axle (4);
    said input shaft (8) and said rear output shaft (12) being coaxial;
    an auxiliary tubular shaft (14) mounted alongside said input shaft (8) to rotate about a second axis of rotation (D) parallel to said first axis of rotation (A);
    at least one first group of gears (15, 16) for selectively connecting said auxiliary tubular shaft (14) mechanically to said input shaft (8);
    a first countershaft (17) mounted for rotation about said second axis of rotation (D) inside said auxiliary tubular shaft (14);
    a second countershaft (18) mounted for rotation about said second axis of rotation (D) opposite said first countershaft (17);
    a planetary gear train (19) for mechanically connecting said auxiliary tubular shaft (14) to said first countershaft (17) and said second countershaft (18); and
    a first (25) and a second (26) cascade gear set for mechanically connecting said second countershaft (18) to said rear output shaft (12), and mechanically connecting said first countershaft (17) to said front output shaft respectively (10).

said front output shaft (10) and said rear output shaft (12) are mounted for rotation respectively about a third axis of rotation (B) and a fourth axis of rotation (C), said third axis of rotation (B) and said fourth axis of rotation (C) parallel to said first axis of rotation (A); and said planetary gear train (19) located between said first countershaft (17) and said second countershaft (18), said planetary gear train (19) comprising:

a pinion (20) fitted to the end of said first countershaft (17);

a ring gear (21) carried by said auxiliary tubular shaft (14) so as to be coaxial with said pinion (10); and a plurality of planet gears (23) mounted for rotation on a planet carrier flange (22) fitted to said second countershaft (18), said plurality of planet gears (23) meshing with said ring gear (21).

12. A four-wheel-drive vehicle transmission (1) comprising:
    an input shaft (8) rotatable about a first axis of rotation (A);
    a front output shaft (10) connected to the front axle (3);
    a rear output shaft (12) connected to the rear axle (4);
    an auxiliary shaft (14) mounted alongside said input shaft (8);
    at least one first group of gears (15, 16) for selectively connecting said auxiliary shaft (14) mechanically to said input shaft (8);
    a first countershaft (17) mounted for rotation about a second axis of rotation (D);
    a second countershaft (18) mounted for rotation about said second axis of rotation (D) opposite said first countershaft (17);
    a planetary gear train (19) for mechanically connecting said auxiliary shaft (14) to said first countershaft (17) and said second countershaft (18); and a first cascade gear set (25) and a second cascade gear set (26) mechanically connecting said second countershaft (18) to said rear output shaft (12), and mechanically connecting said first countershaft (17) to said front output shaft respectively (10);
    said planetary gear train (19) located between said first countershaft (17) and said second countershaft (18), said planetary gear train (19) comprising:
    a pinion (20) fitted to the end of said first countershaft (17);
    a ring gear (21) carried by said auxiliary tubular shaft (14) so as to be coaxial with said pinion (10); and
    a plurality of planet gears (23) mounted for rotation on a planet carrier flange (22) fitted to said second countershaft (18), said plurality of planet gears (23) meshing with said ring gear (21).

13. A four wheel-drive vehicle transmission as claimed in claim 12, wherein:
    said auxiliary shaft (14) comprises a tubular shaft; and
    said first countershaft (17) is mounted inside said auxiliary tubular shaft (14).

14. A four-wheel-drive vehicle transmission as claimed in claim 12, wherein said front output shaft (10) and said rear output shaft (12) are mounted for rotation respectively about a third axis of rotation (B) and a fourth axis of rotation (C), said third axis of rotation (B) and said fourth axis of rotation (C) parallel to said first axis of rotation (A).

15. A four-wheel-drive vehicle transmission as claimed in claim 12, wherein said at least one first groups of gears (15, 16) comprises:
    at least one of pair of first gears (15) for selectively connecting said auxiliary shaft (14) mechanically to said input shaft (8), each of said at least one pair of first gears (15) comprising:
    a primary gear (15*a*) fitted permanently to said input shaft (8) or to said auxiliary shaft (14);
    a secondary gear (15*b*) fitted in freely rotating manner to the other of said input shaft (8) or to said auxiliary shaft (14), said secondary gear (15*b*) meshing with said primary gear (15*a*), and
    a synchronizing unit (15*c*) filled to one of said input shaft (8) or said auxiliary shaft (14), said synchronizing unit (15*c*) positioned alongside said secondary gear (15*b*), said synchronizing unit (15*c*) selectively making said secondary gear (15*b*) angularly integral with said shaft to which it is fitted, so as to transfer drive torque between said input shaft (8) and said auxiliary shaft (14).

* * * * *

UNITED STATES PATENT AND TRADEMARK OFFICE
CERTIFICATE OF CORRECTION

PATENT NO.         : 7,578,762 B2                                Page 1 of 1
APPLICATION NO. : 10/492873
DATED              : August 25, 2009
INVENTOR(S)        : Farnco Cimatti and Carlo Neri It is certified that error appears in the above-identified patent and that said Letters Patent is hereby corrected as shown below:

Column 8, line 35: "filled" should read "fitted"

Signed and Sealed this

Fifteenth Day of June, 2010

David J. Kappos
*Director of the United States Patent and Trademark Office*

UNITED STATES PATENT AND TRADEMARK OFFICE
CERTIFICATE OF CORRECTION

PATENT NO. : 7,578,762 B2
APPLICATION NO. : 10/492873
DATED : August 25, 2009
INVENTOR(S) : Cimatti et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 220 days.

Signed and Sealed this

Seventh Day of September, 2010

David J. Kappos
*Director of the United States Patent and Trademark Office*